Patented Aug. 29, 1944

2,356,933

UNITED STATES PATENT OFFICE 2,356,933

VULCANIZATION OF RUBBER

Paul C. Jones and Roger A. Mathes, Akron, Ohio, assignors to The B. F. Goodrich Company, New York, N. Y., a corporation of New York No Drawing. Original application February 8, 1939, Serial No. 255,358. Divided and this application April 4, 1942, Serial No. 437,690

8 Claims. (Cl. 260—787)

This invention relates to the vulcanization of rubber and to rubber compositions vulcanized in the presence of the accelerators herein described. This case is a division of our copending application Serial No. 255,358, filed February 8, 1939, which has since been issued as Patent No. 2,288,194 on June 30, 1942 and has been reissued as No. 22,300 on April 13, 1943.

It has long been known that rubber may be vulcanized in reduced times in the presence of materials commonly called accelerators. It is an object of this invention to provide a new and exceedingly effective class of accelerators. A further object is to produce rubber compositions having high tensile strength and relatively low elongation.

It has been previously observed that the class of compounds known as 2-mercaptothiazolines, of which the simplest member has the structural formula

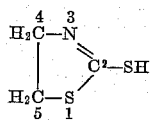

are poor accelerators of vulcanization. This was unexpected in view of their structural similarity to the mercaptothiazoles, which are among the best accelerators known.

We have discovered, however, that mixed zinc salts of monocarboxylic acids and 2-mercaptothiazolines are excellent accelerators of vulcanization. Besides the mixed salts of 2-mercaptothiazoline itself, related compounds wherein one or more of the hydrogens on the carbon atoms of the thiazoline nucleus are replaced by aliphatic or aromatic groups may be employed to accelerate the vulcanization of rubber. Such salts can be prepared from 2-mercapto 4-methylthiazoline; 2-mercapto 5-methylthiazoline; 2-mercapto 4-phenylthiazoline; 2-mercapto 4-methoxymethylthiazoline; 2-mercapto 4-anisylthiazoline; 2-mercapto 4-chlormethylthiazoline; 2-mercapto 4-(p-amino) phenylthiazoline; 2-mercapto 4,4-diethylthiazoline; 2-mercapto 4,5-dimethylthiazoline; and 2-mercapto 4,5-tetramethylenethiazoline and similar compounds.

The mixed zinc salts of this invention are readily prepared from zinc oxide, a 2-mercaptothiazoline and a carboxylic acid (preferably a fatty acid). It has been found that these compounds may be reacted to form mixed zinc salts of fatty acids and 2-mercaptothiazolines which are excellent accelerators of vulcanization and which contain the structure

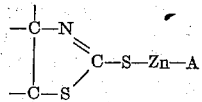

wherein A is a fatty acid residue. This invention is particularly advantageous because the relatively high-melting zinc salts of 2-mercaptothiazolines are sometimes rather difficult to disperse, while the lower-melting mixed zinc salts of a 2-mercaptothiazoline and a saturated or unsaturated fatty acid, preferably one containing eight or more carbon atoms, have equivalent accelerating activity and are easily dispersed in rubber.

The mixed zinc salts of 2-mercaptothiazolines and fatty acids may be prepared by reacting a fatty acid, zinc oxide and a 2-mercaptothiazoline in a 1:1:1 ratio, one mole of water being split off. Thus, 8.1 parts by weight of zinc oxide, 28.4 parts of stearic acid, and 11.9 parts of 2-mercaptothiazoline are reacted by stirring and heating the melted reactants until 1.8 parts of water are given off and a homogeneous mixture is obtained. The mixed salts are in general soap-like materials which melt below 120° C., and are much more easily dispersed in rubber than the higher-melting zinc salts of mercaptothiazolines. The zinc salt of 2-mercaptothiazoline, for instance, from which the foregoing accelerator was prepared melted at about 235° C., while the mixed salt melted at about 115°–120° C.

To demonstrate the effectiveness of the accelerators of this invention, the following compositions were prepared.

| | Composition | | | |
|---|---|---|---|---|
| | A | B | C | D |
| Rubber | 100 | 100 | 100 | 100 |
| Zinc oxide | 5 | 5 | 5 | 5 |
| Sulfur | 3.5 | 3.5 | 3.5 | 3.5 |
| Mixed zinc salt of 2-mercaptothiazoline and caprylic acid | 2.18 | 0 | 0 | 0 |
| Mixed zinc salt of 2-mercaptothiazoline and stearic acid | 0 | 3.13 | 0 | 0 |
| Mixed zinc salt of 2-mercaptothiazoline and lauric acid | 0 | 0 | 2.56 | 0 |
| Mixed zinc salt of 2-mercaptothiazoline and cottonseed fatty acid | 0 | 0 | 0 | 3.13 |

Good dispersions of all of the above accelerators in the rubber compositions were obtained with ease.

The characteristics of the above compositions cured for varying times at 287° F. were as follows, T signifying tensile strength at break in lbs./in.$^2$ and E signifying ultimate elongation in percentage:

| Min. of cure | Composition | | | | | | | |
|---|---|---|---|---|---|---|---|---|
| | A | | B | | C | | D | |
| | T | E | T | E | T | E | T | E |
| 30 | 3,145 | 855 | 3,450 | 815 | 3,210 | 855 | 3,265 | 815 |
| 45 | 3,510 | 840 | 3,770 | 800 | 3,335 | 820 | 3,215 | 800 |
| 60 | 3,535 | 815 | 3,640 | 765 | 3,405 | 805 | 3,515 | 805 |

It will be observed that all of the materials tested were good accelerators of vulcanization.

Any of the saturated or unsaturated monocarboxylic acids such as caprylic, palmitic, oleic, ricinoleic, benzoic, salicylic, toluic, or other like acids may be employed in place of the materials used in the specific examples.

Although the use of the accelerators of this invention has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc. may be vulcanized in the presence of the accelerators herein described. The accelerator may be incorporated in the rubber by mastication, milling or any similar process, or in the case of latex, rubber cement, or any other natural or artificial dispersion or solution of rubber, by simply dissolving or suspending the accelerator therein.

The vulcanization may be performed in other manners than that particularly set forth in the specific examples; specifically, rubber compositions may be heated in the presence of sulfur or selenium in hot air, steam, hot water, etc.

It is to be understood that the term "a rubber" is employed in the appended claims in a generic sense to designate those rubbery materials which are vulcanizable with sulfur, including caoutchouc, balata, gutta percha, latex, rubber isomers, or synthetic rubber whether or not admixed with pigments, fillers, softeners, antioxidants, other accelerators, etc., but not including materials incapable of vulcanization by reaction with sulfur.

While we have herein disclosed specific embodiments of our invention, we do not intend to limit ourselves solely thereto, for it will be obvious to those skilled in the art that many modifications such as using other materials having equivalent properties and varying the proportions of materials used are within the spirit and scope of the invention as defined in the appended claims.

We claim:

1. The process which comprises vulcanizing a rubber in the presence of a mixed zinc salt of a 2-mercaptothiazoline and a monocarboxylic acid containing no functional groups other than the carboxylic group.

2. The process which comprises vulcanizing a rubber in the presence of a mixed zinc salt of a 2-mercaptothiazoline and a fatty acid.

3. The process which comprises vulcanizing a rubber in the presence of a mixed zinc salt of 2-mercaptothiazoline and a fatty acid.

4. The process which comprises vulcanizing a rubber in the presence of a mixed zinc salt of 2-mercaptothiazoline and stearic acid.

5. A rubber which has been vulcanized in the presence of a mixed zinc salt of a 2-mercaptothiazoline and a monocarboxylic acid containing no functional groups other than the carboxylic group.

6. A rubber which has been vulcanized in the presence of a mixed zinc salt of a 2-mercaptothiazoline and a fatty acid.

7. A rubber which has been vulcanized in the presence of a mixed zinc salt of 2-mercaptothiazoline and a fatty acid.

8. A rubber which has been vulcanized in the presence of a mixed zinc salt of 2-mercaptothiazoline and stearic acid.

PAUL C. JONES.
ROGER A. MATHES.